United States Patent
Duym et al.

(10) Patent No.: US 11,988,514 B2
(45) Date of Patent: May 21, 2024

(54) METHODS AND DEVICES ARRANGED FOR ROUTING AUTONOMOUS DRIVING

(71) Applicant: Bayerische Motoren Werke Aktiengesellschaft, Munich (DE)

(72) Inventors: Stefaan Duym, Munich (DE); Felix Rempe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/972,179

(22) PCT Filed: Aug. 9, 2019

(86) PCT No.: PCT/EP2019/071473
§ 371 (c)(1),
(2) Date: Dec. 4, 2020

(87) PCT Pub. No.: WO2020/035417
PCT Pub. Date: Feb. 20, 2020

(65) Prior Publication Data
US 2021/0239476 A1    Aug. 5, 2021

(30) Foreign Application Priority Data

Aug. 14, 2018  (EP) .................................. 18188904

(51) Int. Cl.
*G01C 21/34* (2006.01)
*G05D 1/00* (2006.01)
(Continued)

(52) U.S. Cl.
CPC ..... *G01C 21/3453* (2013.01); *G01C 21/3446* (2013.01); *G05D 1/0061* (2013.01); *G05D 1/0217* (2013.01); *G06Q 10/047* (2013.01)

(58) Field of Classification Search
CPC ............ G01C 21/3453; G01C 21/3446; G05D 1/0061; G05D 1/0217; G05D 2201/0213; G06Q 10/047
See application file for complete search history.

(56) References Cited

U.S. PATENT DOCUMENTS 6,757,667 B1   6/2004 Patel
9,188,985 B1 * 11/2015 Hobbs ................ G01C 21/3626
(Continued)

OTHER PUBLICATIONS

Daniel Delling and Dorothea Wagner, Pareto Paths with SHARC, 2009, see Experimental Algorithms, 8th International Symposium, SEA 2009, Dortmund, Germany, Jun. 2009 Proceedings (Year: 2009).*

(Continued)

*Primary Examiner* — Jess Whittington
*Assistant Examiner* — Terry C Buse
(74) *Attorney, Agent, or Firm* — Crowell & Moring LLP

(57) ABSTRACT

Methods and devices for determining routes for autonomous driving are provided. The following steps are executed: computing K alternative routes from a route source to a route destination; evaluating each one of the K alternative routes, wherein the evaluating comprises determining a Pareto front of the K alternative routes, wherein the Pareto front of the K alternative routes comprises a set of Pareto-optimized routes that are Pareto-optimized with regard to route constraints comprising travel time T, manual driving time $T_M$, and transition count M that indicates a count of transitions from the autonomous driving to a manual driving in a route; if the set of Pareto-optimized routes comprises more than P routes, reducing number of Pareto-optimized routes in the set of Pareto-optimized routes to P; and outputting the Pareto-optimized routes of the set of Pareto-optimized routes as the determined routes for autonomous driving.

18 Claims, 9 Drawing Sheets

(51) Int. Cl.
*G06Q 10/047* (2023.01)
*G05D 1/02* (2020.01)
*G06Q 10/04* (2023.01)

(56) References Cited

U.S. PATENT DOCUMENTS

| | | | |
|---|---|---|---|
| 9,665,101 B1* | 5/2017 | Templeton | G05D 1/0278 |
| 2013/0046467 A1 | 2/2013 | Iwane et al. | |
| 2015/0185033 A1 | 7/2015 | Corne et al. | |
| 2015/0253772 A1* | 9/2015 | Solyom | B60W 50/082 |
| | | | 701/25 |
| 2017/0315551 A1 | 11/2017 | Mimura et al. | |
| 2018/0004211 A1* | 1/2018 | Grimm | G06Q 10/047 |
| 2018/0308371 A1* | 10/2018 | Cao | B64C 39/024 |
| 2019/0311559 A1* | 10/2019 | Bigio | G07C 5/0841 |
| 2020/0189617 A1* | 6/2020 | Takada | G01C 21/34 |
| 2021/0072768 A1* | 3/2021 | Fendt | G08G 1/22 |

OTHER PUBLICATIONS

International Search Report (PCT/ISA/210) issued in PCT Application No. PCT/EP2019/071473 dated Oct. 18, 2019 (two (2) pages).
Written Opinion (PCT/ISA/237) issued in PCT Application No. PCT/EP2019/071473 dated Oct. 18, 2019 (seven (7) pages).
Extended European Search Report issued in European Application No. 18188904.9 dated Jan. 29, 2019 (six (6) pages).

* cited by examiner

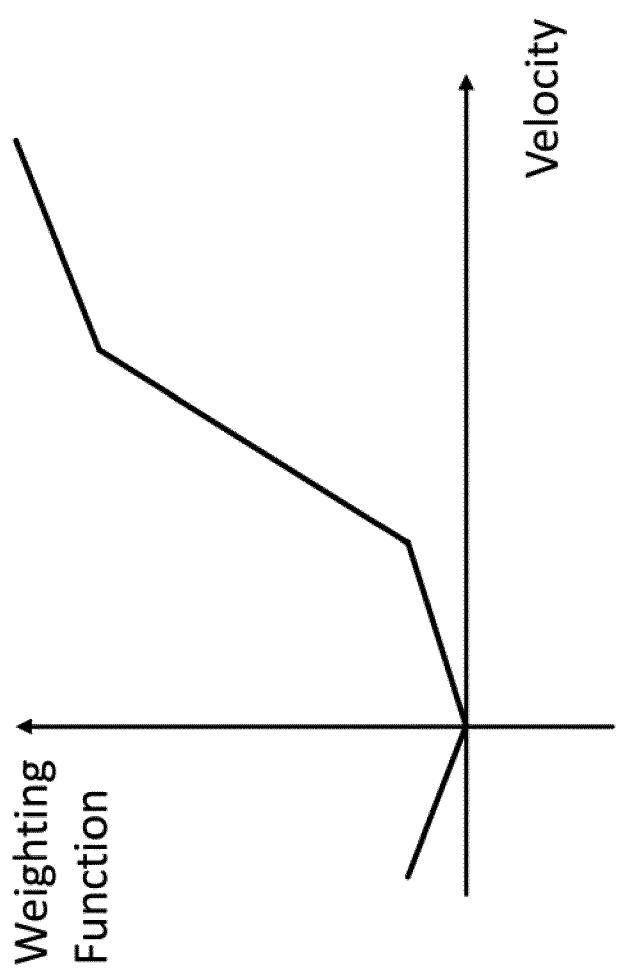

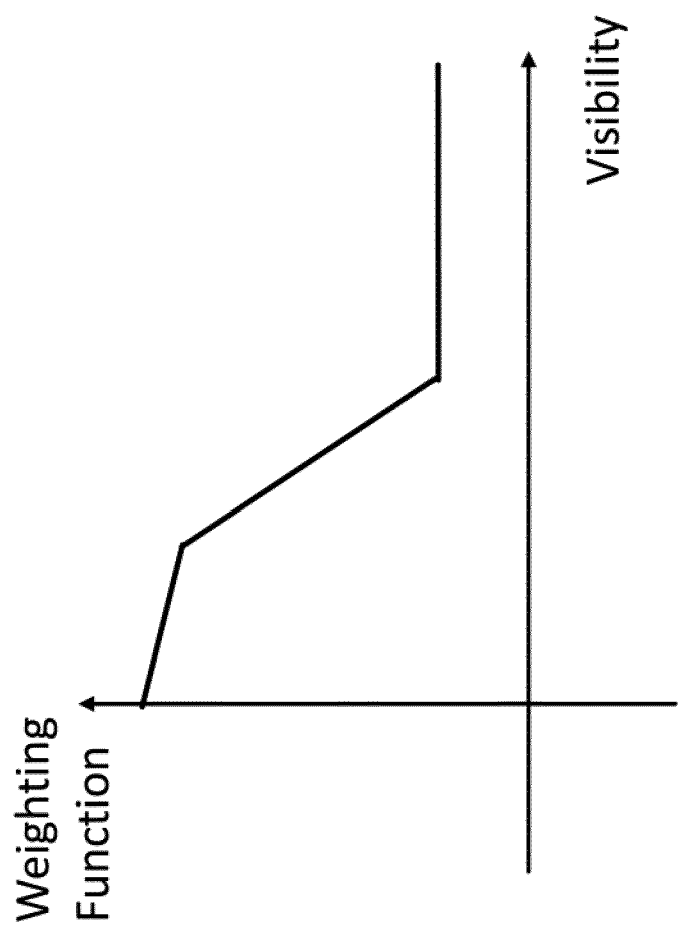

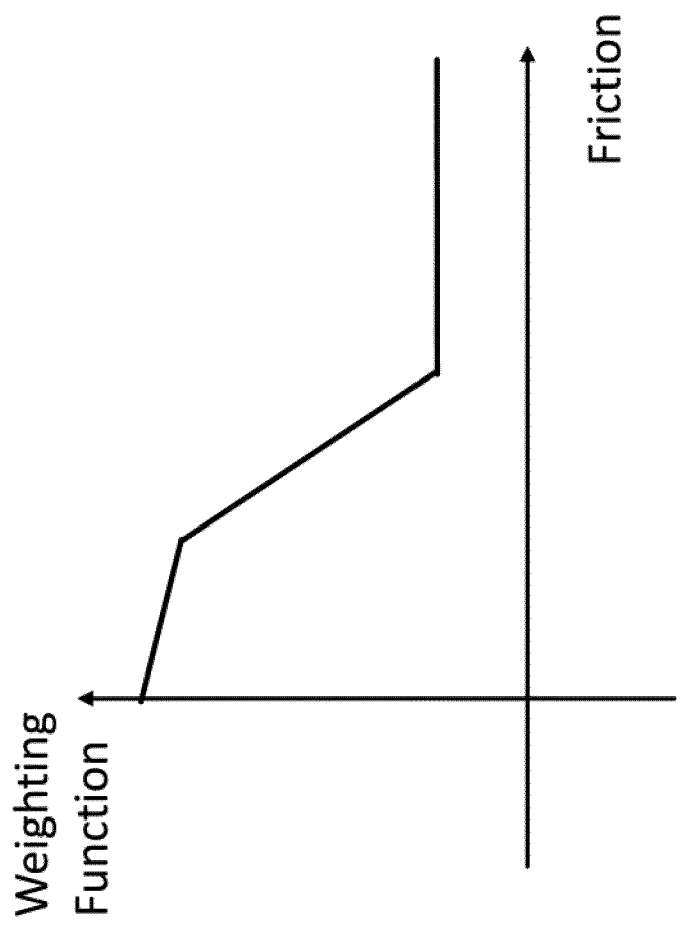

METHODS AND DEVICES ARRANGED FOR ROUTING AUTONOMOUS DRIVING

TECHNICAL FIELD

The present invention is directed to devices and methods arranged to determine routes for autonomous driving.

BACKGROUND

Many known routing methods and devices exist that determine route proposals between a route source and a route destination. For determining route proposals, different criteria are taken into account. Typical criteria comprise, for example, travel time, length of the route, fuel consumption etc. One of most used criterions is the total travel time as it is desired to arrive at the route destination as fast as possible.

Autonomous driving is, however, a rarely used feature in a vehicle. On particular road sections autonomous driving is even impossible because the current technology does not sufficiently support it and/or because of lack of sufficient information that supports safe autonomous driving. Furthermore, to ensure a safe autonomous driving more information has to be taken into account and analyzed. This affects efficiency of routing methods. Particularly, a user of a routing method or device desires an immediate answer on a request for routes from a route source to a route destination and expects optimally determined routes in response to the request.

Therefore, there is still a need for methods and devices for routing autonomously driving vehicles that efficiently determine safe and optimal routes and/or that ensure a safe and optimal routing during a drive.

SUMMARY

Consequently, the object of the present invention is to provide improved methods and devices for routing autonomously driving vehicles that efficiently determine safe and optimal routes and/or that ensure a safe and optimal routing during a drive.

The object of the present invention is achieved by the solution provided in the independent claims. Advantageous implementations of the present invention are further defined in the respective dependent claims, in the present description, and/or in the appended figures.

The present invention proposes a mechanism that overcomes at least the above-mentioned drawbacks. The present invention suggests a vehicle routing method and device, which focus on the requirements of road users using automated vehicles. One of the used criteria is road clearance, which states the possibility to drive autonomously on specific road sections. For several reasons such as adverse weather conditions, incidents or bad road conditions, a road clearance for autonomous driving may be withdrawn. As a result, the vehicle must be driven manually until another cleared road segment is entered. In order to optimize the route choice for the autonomous vehicle, a specific routing method is developed. In addition to a minimal time of non-autonomous driving, it seeks to optimize further aspects becoming relevant for an optimal route for autonomous driving. Different variants of a routing algorithm are possible and can be applied within the scope of independent claims as shown in the following.

According to an aspect, a method for determining routes for autonomous driving is provided, the method comprising: computing K alternative routes from a route source to a route destination; evaluating each one of the K alternative routes, wherein the evaluating comprises determining a Pareto front of the K alternative routes, wherein the Pareto front of the K alternative routes comprises a set of Pareto-optimized routes that are Pareto-optimized with regard to route constraints comprising travel time T, manual driving time $T_M$, and transition count M that indicates a count of transitions from the autonomous driving to a manual driving in a route; if the set of Pareto-optimized routes comprises more than P routes, reducing number of Pareto-optimized routes in the set of Pareto-optimized routes to P; and outputting the Pareto-optimized routes of the set of Pareto-optimized routes as the determined routes for autonomous driving. The method is a computer-implemented method.

According to an embodiment, the evaluating each one of the K alternative routes comprises executing the following steps with regard to each one of the K alternative routes: evaluating each realization of the corresponding alternative route from a plurality of realizations of the corresponding alternative route, wherein the realizations of the corresponding alternative route in the plurality of realizations of the corresponding alternative route differ with regard to the route constraints, wherein the evaluating each realization of the corresponding alternative route from a plurality of realizations of the corresponding alternative route comprises determining a Pareto front of the corresponding alternative route comprising a set of Pareto-optimized route realizations of the corresponding alternative route that are Pareto-optimized with regard to the route constraints; and inserting into the Pareto front of the K alternative routes Pareto-optimized route realizations of the set of Pareto-optimized route realizations of the corresponding alternative route.

According to an embodiment, the route constraints further comprise a stressing cost function indicating a stress caused by the transitions from the autonomous driving to the manual driving in the route.

According to an embodiment, the route constraints further comprise autonomous travel time.

According to an embodiment, the K alternative routes are computed with regard to a digital road map comprising roads divided into corresponding road sections, and wherein each one of the K alternative routes is a path of corresponding road sections.

According to an embodiment, the K alternative routes are computed by taking into consideration road clearance values, each road clearance value being associated with a respective road section and indicating whether or not it is possible/allowed to drive autonomously on the respective road section.

According to an embodiment: a manual travel time $T_M$ of the route is calculated as $$T_M = \sum_{i=1}^{N} (1 - C_i) \cdot T_i,$$

wherein $C_i$ is a road clearance value associated with i-th road section of the route, wherein $C_i=1$ if it is possible to drive autonomously on the i-th road section, wherein $C_i=0$ if it is not possible to drive autonomously on the i-th road section, and wherein N is a number of road sections in the route.

According to an embodiment, a transition count M of the route is calculated as $$M = 1 - C_1 + \sum_{i=2}^{N} C_{i-1} \cdot (1 - C_i).$$

According to an embodiment, a travel time T of a route comprising N road sections is calculated as $$T = \sum_{i=1}^{N} T_i,$$

wherein $T_i$ is a travel time for i-th road section of the route.

According to an embodiment, a stressing cost function S of the route is calculated as $$S = (1 - C_1) \cdot f_1 + \sum_{i=2}^{N} (C_{i-1} \cdot (1 - C_i)) \cdot f_i,$$

wherein $f_i$ is a weighting function characterizing a stress caused by a transition at the i-th road section or the route.

According to an embodiment, the reducing of the number of Pareto-optimized routes in the set of Pareto-optimized routes to P comprises selecting from the set of Pareto-optimized routes P Pareto-optimized routes that meet one or more of the following criteria: minimal travel time T in comparison to the Pareto-optimized routes in the set of Pareto-optimized routes; minimal manual travel time $T_M$ in comparison to the Pareto-optimized routes in the set of Pareto-optimized routes; minimal amount of transitions M in comparison to the Pareto-optimized routes in the set of Pareto-optimized routes; minimal stressing cost function S in comparison to the Pareto-optimized routes in the set of Pareto-optimized routes.

According to an embodiment, the reducing of the number of Pareto-optimized routes in the set of Pareto-optimized routes to P comprises selecting from the set of Pareto-optimized routes P Pareto-optimized routes that maximize a quality measure Q:

$$Q = \frac{1}{\delta \cdot T_M + \gamma \cdot T + \beta \cdot M},$$

wherein $\delta, \gamma, \beta$ are weights.

According to an aspect, a device is provided that is configured to determine routes for autonomous driving. The device is particularly configured to execute steps of the method for determining routes for autonomous driving as described herein. According to an embodiment, the device is a computing device. According to a further embodiment, the device comprises one or more processing units/components/means/entities configured to execute the steps of the method for determining routes for autonomous driving as described herein. Furthermore, according to an embodiment said steps are codified as computer-implemented instructions that, when executed by the one or more processing units/components/means/entities, cause the execution of the steps of the method for determining routes for autonomous driving as described herein.

The present invention allows routing autonomously driving vehicles that efficiently determine safe and optimal routes and/or that ensure a safe and optimal routing during a drive.

By determining alternative routes and by determining the Pareto front with regard to the alternative routes, the present invention allows an efficient routing method for determining routes that minimizes the amount of data to be analyzed and processed and that saves computing and storage resources. Particularly, the present invention allows a real-time determining of routes for autonomous driving by taking into consideration current road states and/or current traffic situation. Thus, the present invention provides routes that enable a safe autonomous driving.

BRIEF DESCRIPTION OF DRAWINGS

The above-described aspects and implementation forms of the present invention will be explained in the following description of specific embodiments in relation to the enclosed drawings.

FIG. 7 shows an exemplary relationship between values of weighting function $f$ with regard to velocity factor according to an embodiment of the present invention.

FIG. 8 shows an exemplary relationship between values of weighting function $f$ with regard to visibility factor according to an embodiment of the present invention.

FIG. 9 shows an exemplary relationship between values of weighting function $f$ with regard to friction factor according to an embodiment of the present invention.

DETAILED DESCRIPTION OF EMBODIMENTS

Figure 1:
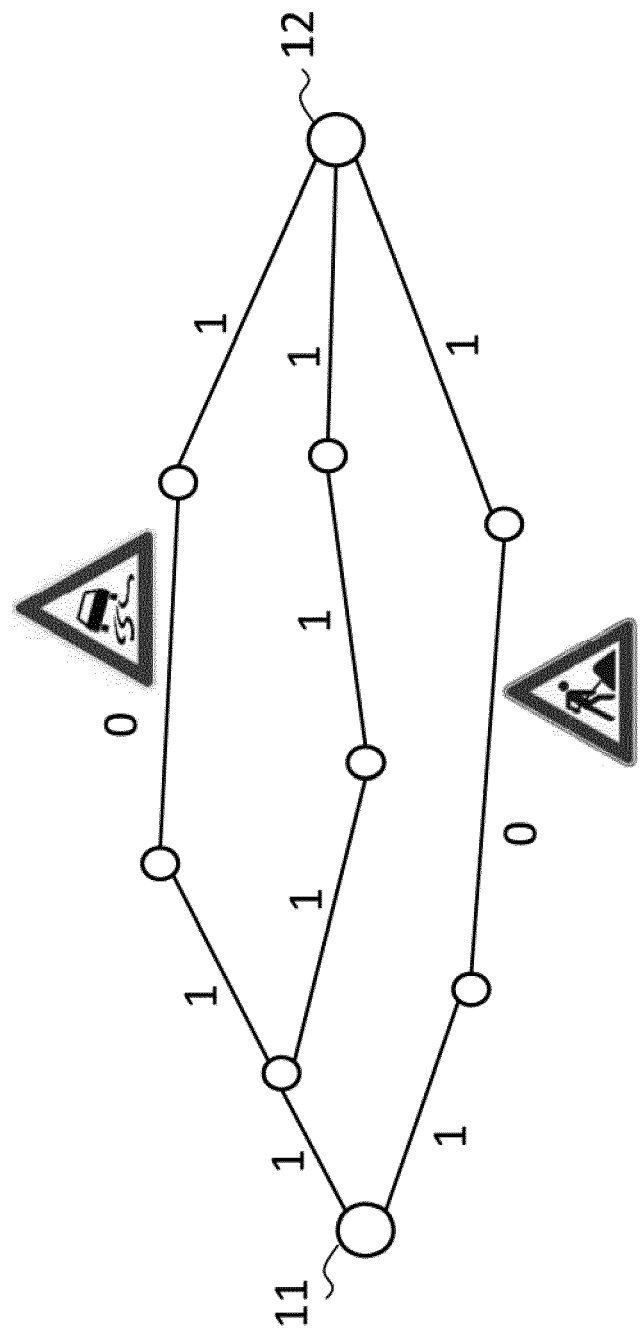
FIG. 1 exemplary shows road clearance for autonomous driving over a road network according to an embodiment of the present invention.

Generally, it has to be noted that all arrangements, devices, modules, components, models, elements, units, entities, and means and so forth described in the present application could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method of the present invention and its various steps are embodied in the functionalities of the various described apparatus elements.

Moreover, any of the embodiments and features of any of the embodiments, described herein, may be combined with each other, unless a combination is explicitly excluded.

The development of Autonomous Driving (AD) is an evolution of assisted driving towards fully autonomous cars that do not need any human interaction. Level 3 of SAE (Society of Automotive Engineers) standard defines and expects that a driver will have to intervene during an autonomously executed drive meaning that only particular road sections can be driven completely autonomously while other road sections are to be driven manually. As a prerequisite, traffic and road conditions must be sufficiently known and safe such that a vehicle can be allowed to drive autonomously in an effective and safe way. This evaluation, denominated as road clearance (for autonomous driving), is calculated in several stages. A first evaluation is performed on basis of on-board sensor information (mainly camera data). In the case the surrounding is sufficiently accurately reconstructed and evaluated as being safe, the vehicle is allowed to drive autonomously. Additionally, relevant information to the actual road segment is sent from the vehicle over the air to a central server where, with the aid of data fusion from sensor signals of different sources, which are geographically wide spread over the road network, it is possible to extend the limited horizon of the independent vehicle. Subsequently, autonomous vehicles request on a regular basis from this server the status of the road clearance for specific road segments in the vicinity around the vehicle.

Possible reasons that can cause the withdrawal of a positive road clearance can be adverse weather conditions (e.g. reduced visibility due to fog or heavy rain, etc.), incidents, missing lane markings or bad road conditions. In this case, the driver has to take over the control over the vehicle when the vehicle is not ready to cope with these situations.

The values, relevant to the road clearance, could come from as well static as dynamic sources. Mainly as dynamic sources, information from other vehicles is considered where static sources are statically fixed sensors near the road. These can vary from loop sensors, radars or cameras to weather stations. Local danger warnings (stone thrower, ghost driver, accidents, traffic jam, etc.) from traffic authorities should also be processed here.

The fusion of this information leads to a decision whether autonomous driving is allowed or not for specified groups or types of autonomous vehicles. This second level road clearance is then communicated from the central server to the individual vehicle based on a map where each road section is characterized with a value for the road clearance. According to an embodiment, in its most primitive form the road clearance is represented as a Boolean value. This is exemplary shown in FIG. 1.

FIG. 1 exemplary shows road clearance for autonomous driving over a road network according to an embodiment of the present invention. In FIG. 1 node 11 represents a route source, and node 12 represents a route destination. The routes, exemplary possible between the route source 11 and the route destination 12 are shown by edges/links, representing road sections, and intermediate nodes connecting the route source 11 and the route destination 12. In FIG. 1, each edge/link and, thus, road section is associated with a respective clearance value indicating whether or not it is possible to drive autonomously on the respective road section. The clearance values may be arranged in any appropriate way, e.g. as Boolean values. In FIG. 1, a clearance value associated with a particular edge/link or road section respectively and equal 1 indicates that it is possible to drive on the respective particular road section autonomously. A clearance value associated with a particular edge/link or road section respectively and equal 0 indicates that it is not possible/allowed to drive on the respective particular road section autonomously and that, thus, manual driving has to be done.

As explained above, the determination of the clearance values is done by using at least one of the following information: information from sensors installed at roads, i.e. at road sections, traffic information (available, e.g., via traffic broadcast and/or other appropriate traffic service), weather information (available, e.g., via corresponding weather information services), information form other vehicles (e.g., collected by corresponding vehicle sensors) that recently passed said roads, i.e. road sections.

According to the present invention, a device arranged for determining routes and/or for controlling the routing receives (e.g., from a server arranged to collect said information as described above) the corresponding clearance values.

In FIG. 1, it is possible to drive autonomously on the most of the road sections as the most of the clearance values are equal 1. Only two road sections require manual driving. One road section (see the upper middle edge/link or road section respectively) requires manual driving because of slippery road, and another road section (see the lower middle edge/link or road section respectively) requires manual driving because of roadworks on the road section.

One of fundamental and essential goals of autonomous vehicles is to take over the control over the vehicle so that the human passengers have more freedom to pursue other activities besides driving. Especially, where driving becomes a boring activity like driving with constant speed on long highways or a stressing activity like driving in traffic jams, it is beneficial for the driver's comfort to have autonomous driving.

Road sections where autonomous driving is not (yet) possible or not allowed implicate that a human driver must take over. This is stressing for the human driver and disturbs his comfort and free time that he was enjoying during the autonomous drive (e.g. watching a movie). Also, the transition from autonomous driving to manual driving could pose safety issues dependent how fast and under what conditions this transition is being made. The driver's attention on the transition has to be attracted timely. For example, fast speed and slow driver's reaction may cause heavy accidents in case of a transition from autonomous driving to manual driving. Therefore, it is important for comfort and, particularly, for safety to minimize these transitions and also the time of manual driving. Hereby, the router does not have as highest priority to find the shortest way to the end position but a longer route could even be acceptable if the drive could be performed completely or nearly completely autonomously. Present invention optimizes autonomous routing based on the route clearance.

Figure 2B:
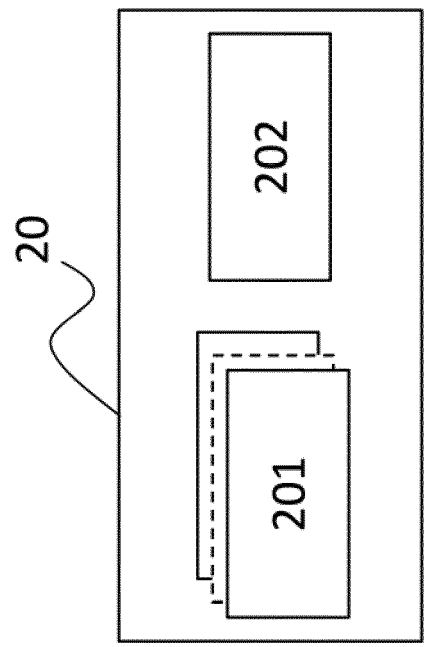
FIG. 2b shows a further exemplary arrangement of a device configured to determine routes for autonomous driving according to an embodiment of the present invention.
Figure 2A:
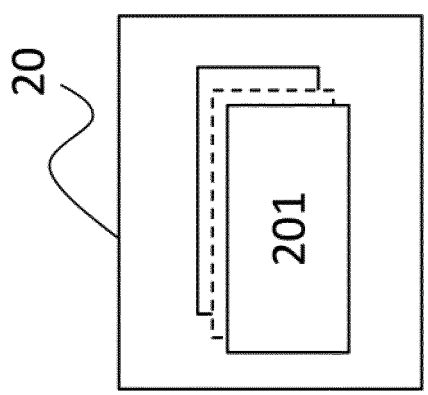
FIG. 2a shows an exemplary arrangement of a device configured to determine routes for autonomous driving according to an embodiment of the present invention.

FIG. 2a shows an exemplary arrangement of a device 20 configured to determine routes for autonomous driving according to an embodiment of the present invention. According to the embodiment of FIG. 2a, the device 20 comprises one or more processing units/components/means/entities (e.g., processors) 201 that are configured to execute any one of the steps for determining routes for autonomous driving as described herein. Thus, the device 20 is a computing device.

FIG. 2b shows a further exemplary arrangement of a device 20 configured to determine routes for autonomous driving according to an embodiment of the present invention. According to the embodiment of FIG. 2b, the device 20 comprises, besides the one or more processing units/components/means/entities 201, a display unit/component/means/entity 202 configured to display information on the determined routes, digital map, and/or determined routes on the map.

The device 20 as exemplary shown in FIGS. 2a and 2b may comprise also any further units/components/means/entities. E.g., according to an embodiment, the device 20 comprises one or more receiving units/components/means/entities arranged to receive information, e.g. information on the clearance values, information on digital maps, information on roads, and/or any further relevant information. According to a further embodiment, the device 20 comprises one or more transmitting units/components/means/entities arranged to transmit information or data, e.g. requests for clearance values, requests for digital map information, requests for road information, and/or any further information or data. Here, different appropriate arrangements of the device 20 are possible.

As mentioned, the device 20 is configured to execute any one of the steps for determining routes for autonomous driving as described herein. Particularly, the device 20 is configured to execute any one of the steps for determining routes for autonomous driving as described in the following.

The goal of a vehicle routing method is to find a sequence of links or road sections respectively, which connect the route source 11 and the route destination 12 under consideration of objectives to be optimized and constraints to be respected. The present invention focuses on the problem of routing AD vehicles. It develops cost functions and, utilizing routing techniques, provides a set of alternative routes that supports a road user or fleet manager in their decision.

As exemplary shown in FIG. 1, a digital map is representable as a directed graph G=(V, E) where V denotes a set of nodes and E denotes a set of edges/links or road sections respectively. Considering a route comprising N links/edges or road sections respectively, the total travel time required to pass a route is calculated as $$T = \Sigma_{i=1}^{N} T_i, \quad (1)$$

wherein $T_i$ is a travel time for i-th link/edge or road section of the route, wherein $1 \leq i \leq N$.

For optimizing an autonomous drive, the manual travel time should be minimized which is calculated as:

$$T_M = \Sigma \Sigma_{i=1}^{N} (1-C_i) \cdot T_i, \quad (2)$$

wherein $C_i$ is a road clearance value associated with i-th link/edge or road section of the route.

Considering the discomfort caused by transitions from autonomous driving to manual driving the number/count of these transitions should preferably also be considered as:

$$M = 1 - C_1 + \Sigma_{i=2}^{N} C_{i-1} \cdot (1-C_i). \quad (3)$$

If discomfort caused by transitions is scrutinized, it is observed that not all transitions cause the same amount of stress to the driver. Considering this, a stressing cost function could be calculated as:

$$S = (1-C_i) \cdot f_1 + \Sigma_{i=2}^{N} (C_{i-1} \cdot (1-C_i)) \cdot f_i. \quad (4)$$

$f_i$ a weighting function characterizing the stress caused by a particular transition at link/edge or road section i. Generally, the stress at transitions depends on many factors such as weather, road, traffic and/or vehicle conditions. Therefore, the weighting function can be defined arbitrarily complex.

A typical approach in order to find a route that minimizes an objective is to use adaptions of the Dijkstra algorithm (such as A*), which is well known to the skilled person. At the end, usually one specific route is returned. This procedure is justified in the case where only one objective is supposed to be optimized. The AD routing is designed to optimize two or more requirements. Therefore, in order to apply a routing procedure that requires edge-costs, the overall travel time T, the manual driving time $T_M$ and transition count M are combined as a weighted sum. As a result, one optimal route would be returned. Though, defining the weights is somewhat arbitrary and is related to individual preferences. A more valuable result for a road user or fleet operator is a set of alternative routes, which contrasts the properties of each route and which provides a basis for decision. Generally, in multi-objective optimization from all viable solutions a so-called Pareto front is deduced. The calculation of the Pareto front is well known and, therefore, will be not described in more detail in the following. For any solution that lies on the Pareto front it holds that there does not exist another solution, which is more optimal in one objective without being inferior for another objective. As known, Pareto optimization is applied to optimizations where a plurality of constraints (e.g., at least two) is considered and optimized. The Pareto front is a set that comprises optimal solutions determined by use of the Pareto optimization. Given the Pareto front, the decision on the importance of one objective is directed to the road user or fleet manager.

Depending on problem complexity, the calculation of a Pareto front might demand extensive resources. In the routing case, this would require to calculate all possible routes between start and end point. The present invention solves this in that a set of alternative routes is determined before executing Pareto optimization, i.e. before determining the Pareto front. Thus, a more efficient route determination is achieved, wherein both computing and storage resources are saved at the same time. Additionally, a real time route determination can be achieved in response to received clearance values reflecting the current road and road section conditions and/or states.

According to the present invention, a set of alternative routes (e.g., K alternative routes, where K is positive integer and K≥2) is determined. This determination of the set of alternative routes is referred to also as "Choice routing". Particularly, a small set of routes with significant differences and comparable travel times is computed. The determined alternative routes already represent the (travel-time) optimal routes for a great number of slight variations. For determining the alternative routes, any known alternative route determination or "Choice routing" method can be used. An exemplary method is the Camvit Choice Routing (see http://www.camvit.com/camvit-technical-english/Camvit-Choice-Routing-Explanation-english.pdf). However, also further appropriate methods can be used.

According to an embodiment of the present application, the following steps are performed: Firstly, K alternative routes are computed between A and B. Secondly, all realizations of each route are evaluated with respect to their travel time T, manual driving time $T_M$ and transition count M. As a result, for each route, a corresponding individual Pareto front is deduced. All individual resulting fronts are subsequently merged into one final Pareto front. Finally, some criteria are applied that reduce all solutions of the Pareto front to P routes, wherein P is a positive integer. These route choices are supposed to have substantial differences (e.g., with regard to their travel time T, manual driving time $T_M$ and/or transition count M) and to allow a quick decision on an appropriate route to be used.

Figure 3:
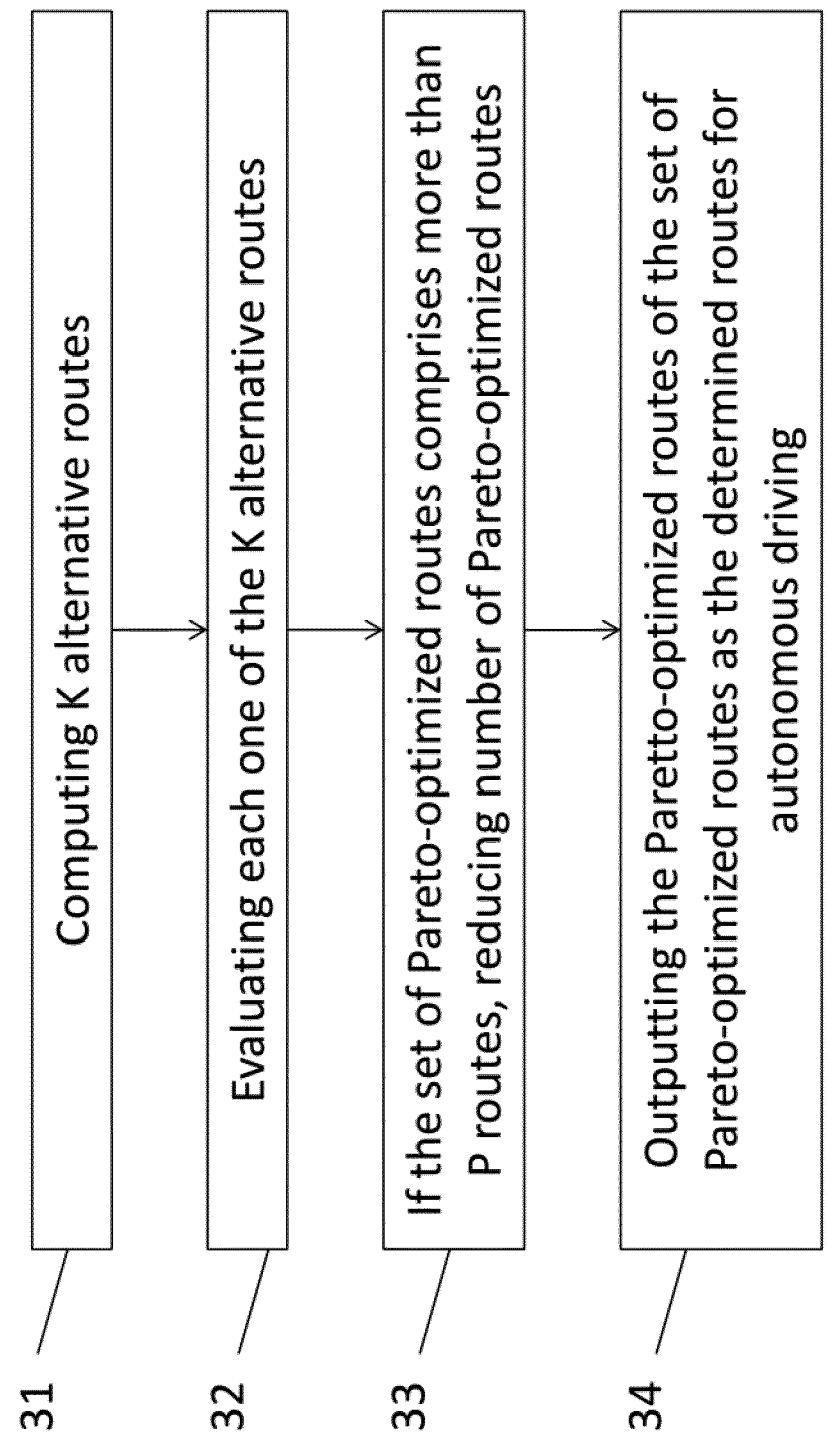
FIG. 3 shows steps executed for determining routes for autonomous driving according to an embodiment of the present invention.

FIG. 3 shows steps executed for determining routes for autonomous driving according to an embodiment of the present invention. As mentioned above, said steps are executable by the device 20 or the one or more processing units/components/means/entities (e.g., processors) 201 respectively.

In step 31, K alternative routes are determined. As mentioned above, any appropriate alternative route determination method can be applied. For example, the K alternative routes are determined by use of the Camvit Choice Routing method. The determining of the K alternative routes is executed by use of the clearance values as one of the criteria for assessing the routes. For example, K alternative routes are determined such that they have a minimum number of transitions, maximum autonomous travel time, minimal manual travel time, and/or minimum (total) travel time. Here, also any further appropriate criteria can be applied.

Figure 5:
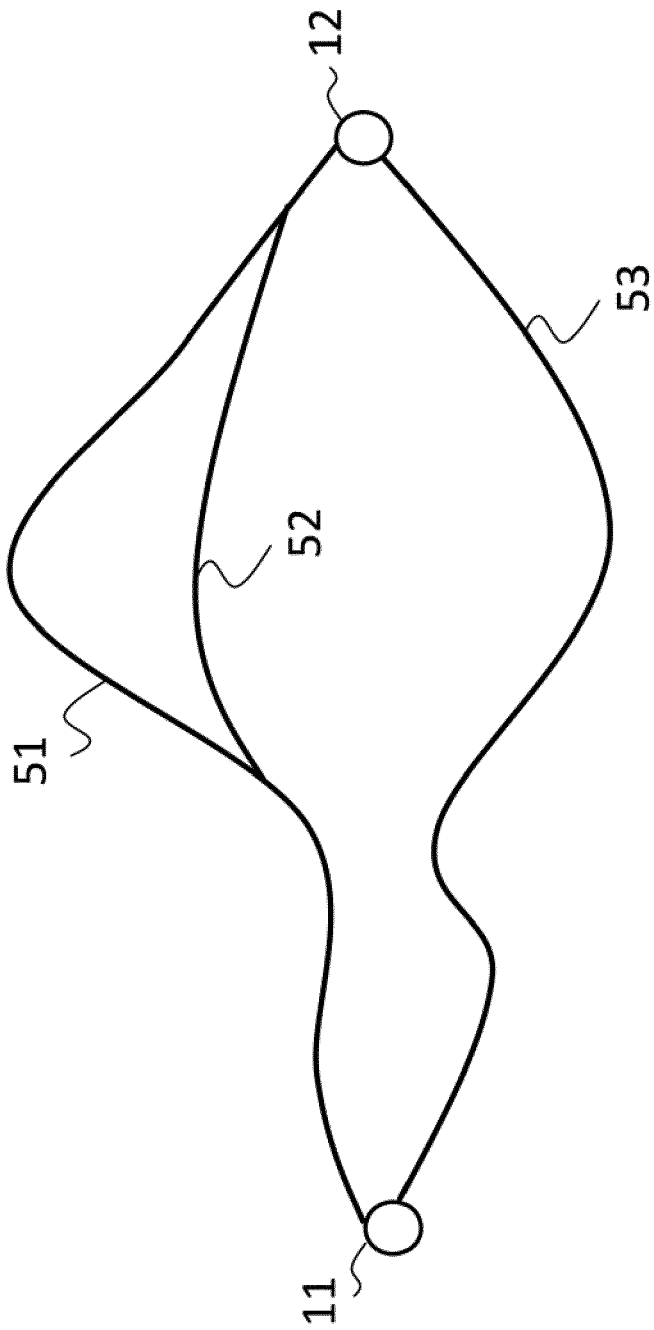
FIG. 5 visualizes an exemplary result of K alternative route determination according to an embodiment of the present invention.

FIG. 5 visualizes an exemplary result of K alternative route determination according to an embodiment of the present invention. According to the embodiment of FIG. 5, three alternative routes 51, 52, and 53 are determined. According to the present embodiment, the three determined alternative routes 51, 52, and 53 have, for example, the following properties:

|  | Route 51 | Route 52 | Route 53 |
| --- | --- | --- | --- |
| Travel time T (min) | 111 | 120 | 123 |
| Autonomous travel time (min) | 80 | 86 | 103 |
| Manual travel time $T_M$ (min) | 31 | 34 | 20 |
| Count/Number of transitions M | 10 | 5 | 8 |

According to the embodiment of FIG. 5, the first route 51 is the fastest of the three alternative routes. Conventional cars would preferably choose this variant. However, the route 51 needs a fairly long portion to be driven manually. The second alternative route 52 offers a longer autonomous drive but it also contains a longer manual portion and the total travel time is also longer, which makes it therefore not so attractive. The third alternative route 53 is even longer in total travel time but the travel time to be driven manually is the lowest among all three alternative routes 51 to 53, which makes it now more attractive. Nevertheless, if the number of transitions from the autonomous to the manual driving is analyzed, the third alternative route 53 needs a relatively high number of transitions, which makes the drive possibly not comfortable for the human driver. In order to decide between those three variants it would be necessary to better understand what would be the ideal drive for the passengers. Therefore, the above equation (4) may offer a further extension to detail the discomfort and stress that a human driver would experience during the drive while taking over the control of the vehicle. According to an embodiment, the equation (4) is applied to improve the quality of the resulting routes with regard to the route constraints desired to be met optimally. According to a further embodiment, an appropriate selection of the weighting function $f$ is executed. Here, different arrangements of the weighting function $f$ are possible.

For example, different factors influencing the driving are taken into consideration for arranging weighting function $f$ at i-th transition between autonomous driving and manual driving. Such factors comprise, for example, velocity, visibility, friction, and/or any other appropriate factors. The present invention is not limited to these exemplary listed factors only. Any further appropriate factors may be used as well.

FIG. 7 shows an exemplary relationship between values of weighting function $f$ with regard to velocity factor according to an embodiment. When the vehicle stands, it is usually unproblematic for the human driver to take over the control of the vehicle and to transition from automatic to manual driving. Therefore, the weighting function $f$ can be very low over even zero. In the embodiment of FIG. 7, the weighting function $f$ has the value zero when the vehicle stands (i.e., when the velocity is equal zero km/h). At higher velocities of a vehicle, it will become more and more difficult or even dangerous to take over the control. Thus, with increasing vehicle velocity also the values of the weighting function $f$ increase according to the embodiment of FIG. 7.

FIG. 8 shows an exemplary relationship between values of weighting function $f$ with regard to visibility factor according to an embodiment. According to the present embodiment, the visibility is also considered as being relevant factor with regard to a transition from autonomous to manual driving. When the vehicle is driving in a dense fog with a very low visibility, it can be tricky or even dangerous for the human driver to take over the control of the vehicle. Therefore, the weighting function should be very high in case of no (zero) or nearly no visibility, as exemplary shown in FIG. 8. If the visibility improves, i.e. if the visibility values increase in FIG. 8, it becomes less problematic for the human driver to take over safely the control. Therefore, the weighting function decreases for higher values of visibility. In the embodiment of FIG. 8, the weighting function has no zero value because it is assumed that even at good visibility values some risks of controlling the vehicle may be present. This situation is, however, exemplary, and different appropriate arrangements of the weighting function $f$ with regard to the visibility factor are possible.

FIG. 9 shows an exemplary relationship between values of weighting function $f$ with regard to friction factor according to an embodiment. In the embodiment of FIG. 9, friction factor is used exemplary as a road condition describing factor. Among road condition factors, friction factor is one of exemplary road condition factors that could or should be taken into consideration when executing a transition from automatic to manual driving. When the vehicle is driving on an icy road (with very low friction value), for example, it can be tricky or even dangerous for the human driver to take over the control of the vehicle. Therefore, the weighting function $f$ should be very high. If the friction value improves, i.e. if the friction value increases, it becomes less problematic for the human driver to take over safely the control when transitioning from automatic to manual driving is executed. Therefore, according to the embodiment of FIG. 9, the weighting function $f$ decreases for higher friction values. In the embodiment of FIG. 9, the weighting function has no zero value because it is assumed that even if a good friction value is present some risks of controlling the vehicle may be present. This situation is, however, exemplary, and different appropriate arrangements of the weighting function $f$ with regard to the friction factor are possible.

For the sake of simplicity, according to an embodiment, the factors influencing the driving safety are treated independently of each other. Thus, the weighting function factors influencing the driving can be calculated as a product of individual factors considered. For example, when considering at least one of the above mentioned factors velocity, visibility, and friction and/or when considering further appropriate factors, the weighting function is as follows:

$$f(velocity, visibility, friction, \ldots) = f_{vel}(velocity) * f_{vis}(visibility) * f_{fric}(friction) * \quad (5)$$

Here, different combinations of different factors are possible.

Generally, it is also possible to consider dependencies between the factors and to use multidimensional functions which can be defined arbitrarily complex.

The above mentioned factors to be considered when transitioning from autonomous to manual driving are exemplary and other appropriate (driving safety relevant) factors can be used. The choice of the factors will depend on individual applications, on availability of the respective information, and/or on whether or not individual factors are considered as being important. For example, human attention factor can be used, the human attention factor indicating whether the human driver paying attention or is distracted (for example, watching a movie, having a phone call, etc.).

Further, also cases may occur where it is not always possible to use the above-mentioned factors because these might not be available and/or directly measured. Instead, according to an embodiment, these missing factors can be substituted by models based on other variables which are related to that variable. For example, regarding friction values, it might be helpful to consider temperature values. Temperatures near or below zero could indicate the possibility of low friction (e.g., presence of ice). Also detecting rain (e.g., over a rain sensor) could give an indication of visibility as well as of the friction value of the road.

In view of the aforesaid, it is noted that the present invention allows the use of different factors, different combinations of factors, and/or further appropriate arrangements of weighting functions $f$.

Correspondingly, in step 32, each one of the K alternative routes is evaluated. Hereto, a Pareto front of the K alternative routes is determined. The Pareto front of the K alternative routes comprises a set of Pareto-optimized routes that are Pareto optimized with regard to the route constraints comprising the (total) travel time T, the manual driving time $T_M$, and the transition count M. As mentioned above, according to an embodiment the route constraints comprise also the stressing cost function of equation (4).

Figure 4:
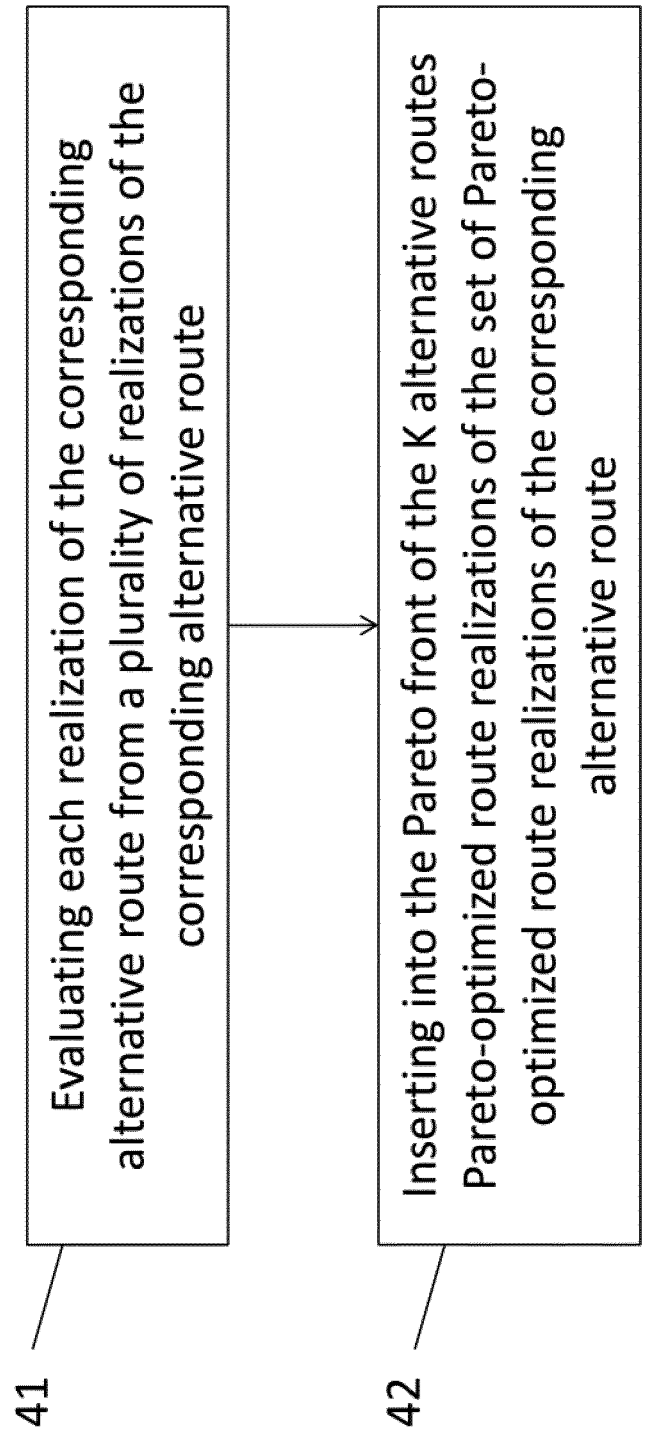
FIG. 4 shows steps for evaluating K alternative routes according to an embodiment of the present invention.

A more detailed execution of the K alternative route evaluation in step 32 is exemplary shown in FIG. 4. As mentioned above, said steps are executable by the device 20 or the one or more processing units/components/means/entities (e.g., processors) 201 respectively.

In step 41, each realization of the corresponding alternative route 51, 52, 53 from a plurality of realizations of the corresponding alternative route 51, 52, 53 is evaluated. The realizations of the corresponding alternative route 51, 52, 53 differ from each other with regard to the route constraints. Each realization has a different (total) travel time T, manual driving time $T_M$, transition count M, stressing cost function of equation (4), and/or autonomous travel time. The commonality among the different realizations of an alternative route 51, 52, 53 is their orientation towards the respective alternative route 51, 52, 53, e.g. their orientation towards the links/edges or the road segments respectively and/or the nodes of the respective alternative route 51, 52, 53, wherein each one of the different realizations of an alternative route 51, 52, 53 may comprise one or more links/edges or road segments respectively and/or one or more nodes that are not present in the respective alternative route 51, 52, 53.

Among the realizations of the corresponding alternative route 51, 52, 53 a corresponding route-specific or individual Pareto front is determined with regard to the route constraints.

In step 42, realizations of a set of Pareto-optimized route realizations of a corresponding alternative route 51, 52, 53 are inserted into the Pareto front of the K alternative routes. Thus, route realizations of a Pareto front of each individual alternative route 51, 52, 53 are inserted into the Pareto front of the K alternative routes. The Pareto front of the K alternative routes comprises, thus, the optimum of all realizations of the individual routes.

Figure 6:
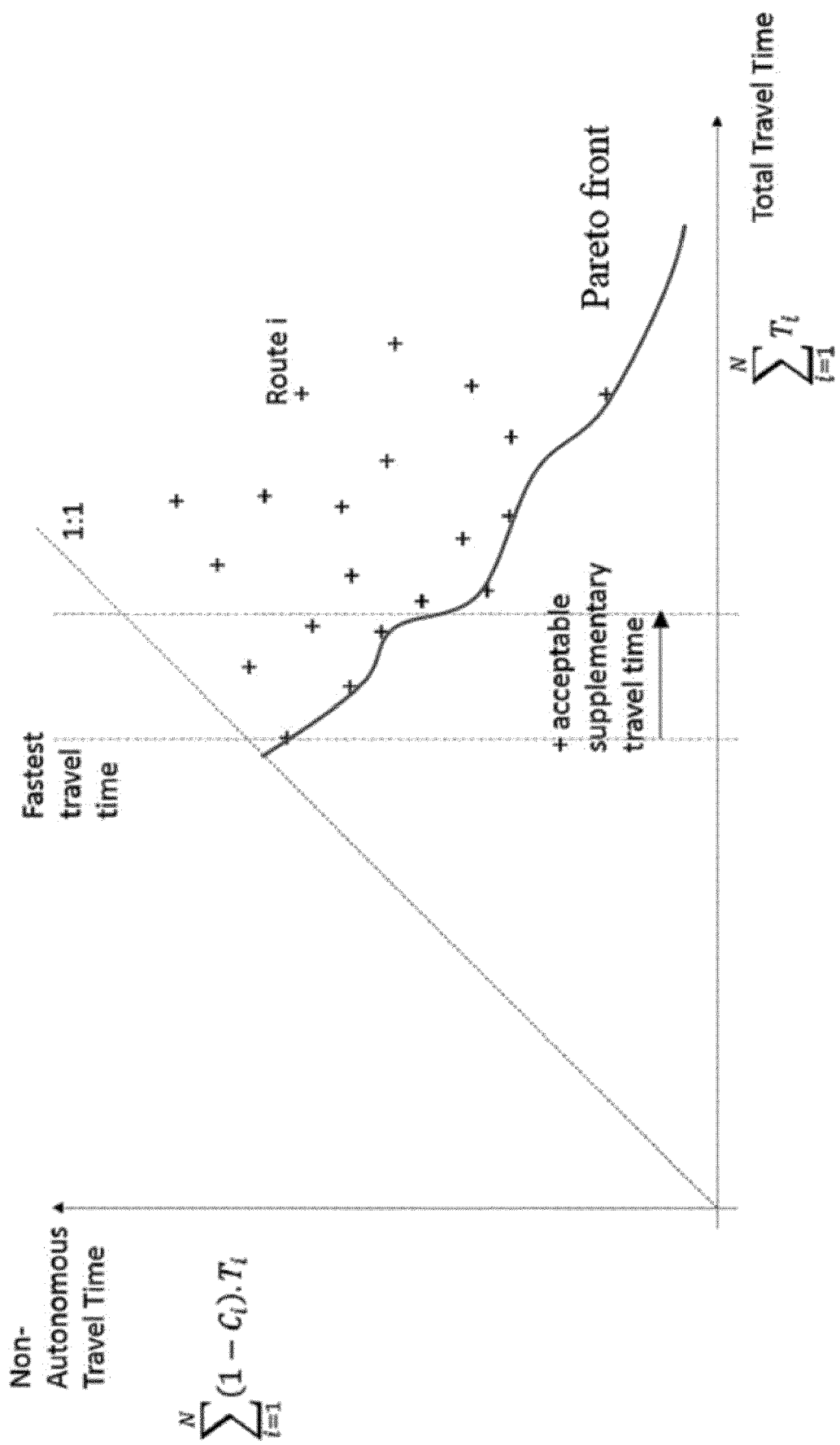
FIG. 6 shows an exemplary evaluation of alternative routes according to an embodiment of the present invention.

FIG. 6 shows an exemplary evaluation of the alternative routes (e.g., routes 51, 52, 53 of FIG. 5, wherein FIG. 6 exemplary shows more than the three alternative routes 51, 52, 53 of FIG. 5, and wherein the number of the alternative routes vary depending on the individual search and/or geographic area). Particularly, FIG. 6 exemplary shows the properties/constraints of a number (K) of generated alternative routes as 2D scatter plot and a resulting estimated Pareto front. For sake of clarity, only two properties/constraints are shown, since displaying of more than two dimensions make the illustration more complicated. In FIG. 6, visualization of the third dimension (i.e. the number of transitions M in FIG. 6) has been omitted. Only the properties/constraints of non-autonomous, i.e. manual travel time $T_M$ and the total travel time T are shown.

In step 33, if the set of Pareto-optimized routes in the Pareto front of the K alternative routes comprises more than P routes, the number of Pareto-optimized routes is reduced. There the reducing of the number of Pareto-optimized routes in the set of Pareto-optimized routes to P comprises, according to an embodiment, for example, selecting from the set of Pareto-optimized routes P Pareto-optimized routes that meet one or more of the following criteria: minimal travel time T in comparison to the Pareto-optimized routes in the set of Pareto-optimized routes; minimal manual travel time $T_M$ in comparison to the Pareto-optimized routes in the set of Pareto-optimized routes; minimal amount of transitions M in comparison to the Pareto-optimized routes in the set of Pareto-optimized routes; minimal stressing cost function S in comparison to the Pareto-optimized routes in the set of Pareto-optimized routes.

According to an embodiment, the reducing number of Pareto-optimized routes in the set of Pareto-optimized routes to P comprises selecting from the set of Pareto-optimized routes P Pareto-optimized routes that maximize a quality measure Q:

$$Q = \frac{1}{\delta \cdot T_M + \gamma \cdot T + \beta \cdot M},$$

wherein $\delta$, $\gamma$, $\beta$ are weights. The weights $\delta$, $\gamma$, $\beta$ quantify the significance of each of the criteria T, $T_M$ and M in relation to each other, i.e. they control the sensitivity of each of the criteria on the quality Q. Here, the quality is interpreted as a relative metric that allows to compare route realizations for one origin-destination relation. For instance, if $\delta$ is much larger than $\gamma$ and $\beta$ the term $\delta \cdot T_M$ evaluated for one realization of a route alternative would be large. Effectively, $T_M$ would have a high impact on the resulting quality. These weights may be constants that have been set in the system calculating the set of routes, or may be functions that depend on various variables such as individual preferences of a user for whom a set of alternative routes is calculated. For instance, one user of the routing system might prefer short manual driving times $T_M$ and is willing to accept larger total travel times T or a higher number of transitions M. A different user might prefer to have a small number of transitions M and compromises this preferences with rising T and/or $T_M$. This preference may also be time dependent, might depend on the type of vehicle etc.

By use of the quality measure Q, a balance between the criteria of manual travel time $T_M$, travel time T, and number of transitions M is achieved, and thus the probability of finding optimal routes is increased. Additionally, efficient evaluation of the routes is enabled. It is noted that the present application is not limited to the above described exemplary arrangements of the weights δ, γ, β only and that also further appropriate arrangements are possible.

According to an embodiment, also the set of Pareto-optimized routes in the Pareto front of the K alternative routes can be also reduced by selecting routes, which have a maximal acceptable supplementary travel time with respect to the fastest solution. This is shown in FIG. 6, where only three routes are selected from the Pareto front of the K alternative routes.

The route reduction step 33 is not limited to the above-described examples. Additionally or instead also the following aspects may be incorporated into step 33:

1) Is the driver willing to take a (much) longer travel time into account to have a minimal manual travel time? If he has a certain fixed deadline (like catching an airplane), a longer travel time, should not exceed a certain time limit. On the other hand, if no strict deadline is existing, and the driver prefers to spent his time to other activities besides driving (like watching a movie), he would probably prefer a longer total travel time with a longer portion of autonomous driving.

2) How many interruptions does the driver accept? For each transition from autonomous driving to manual driving, the driver must interrupt his other activities and concentrate on driving. This can be experienced as being very stressful depending on many factors, but mainly safety-related conditions like (high) speed or (bad) weather conditions (snow, heavy rain) contribute to a high measure of discomfort or stress during transitions.

The cost function is therefore not only dependent on the external conditions (traffic, weather) but also on internal conditions (speed, vehicle status) as well as on human passenger related issues (schedule, physical condition (sleepy, drunk, etc.), free time activity). Ideally, the router should find the best route for the human passengers and this depends on many aspects as it was before autonomous driving too. The aspect of autonomous driving now offers even more possibilities to increase the level of comfort but therefore makes it also more complicated to find the optimal route for an autonomous drive.

It is noted that the route reduction methods described exemplary above may be combined with each other as desired according to a given application.

In step 34, the Pareto-optimized routes of the set of Pareto-optimized routes are output as the determined routes for autonomous driving. Thus, if step 33 has been executed, the reduced set of Pareto-optimized routes is output, i.e. the P routes are output.

As shown above, the present invention refers to a route determination method and device, which optimize the needs of road users with autonomously driving vehicles. Specifically, it considers the overall travel time, the manual driving time, and the number of transitions between an autonomous driving mode and a manual driving mode. The proposed method estimates a Pareto front of optimal routes balancing these objectives. For the user, the Pareto front allows to quickly receive and select the ideal route that matches best their personal preferences.

It has to be noted that any of the embodiments and features of any of the embodiments, described herein, may be combined with each other, unless a combination is explicitly excluded.

Additionally, also other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for determining routes for an autonomous driving vehicle, the method comprising:
computing K alternative routes from a route source to a route destination of the autonomous driving vehicle;
evaluating each one of the K alternative routes, wherein the evaluating comprises
determining a Pareto front of the K alternative routes, wherein
the Pareto front of the K alternative routes comprises a set of Pareto-optimized routes that are Pareto-optimized with regard to route constraints comprising a travel time T of the route, a manual driving time $T_M$ of the route, and a transition count M that indicates a count of transitions from an autonomous driving mode to a manual driving mode;
when the set of Pareto-optimized routes comprises more than P routes, reducing the Pareto-optimized routes in the set of Pareto-optimized routes to P; and
outputting the Pareto-optimized routes of the set of Pareto-optimized routes as the determined routes for autonomous driving, wherein
the evaluating each one of the K alternative routes further comprises executing the following steps with regard to each one of the K alternative routes:
evaluating each realization of the corresponding alternative route from a plurality of realizations of the corresponding alternative route, wherein
the realizations of the corresponding alternative route in the plurality of realizations of the corresponding alternative route differ with regard to the route constraints, and
the evaluating each realization of the corresponding alternative route from a plurality of realizations of the corresponding alternative route comprises determining a Pareto front of the corresponding alternative route comprising a set of Pareto-optimized route realizations of the corresponding alternative route that are Pareto-optimized with regard to the route constraints; and
inserting into the Pareto front of the K alternative routes Pareto-optimized route realizations of the set of Pareto-optimized route realizations of the corresponding alternative route.

2. The method according to claim 1, wherein the route constraints further comprise a stressing cost function indicating a stress caused to a driver by the transitions from the autonomous driving mode to the manual driving mode.

3. The method according to claim 2, wherein the route constraints further comprise an autonomous travel time.

4. The method according to claim 1, wherein
the K alternative routes are computed with regard to a digital road map comprising roads divided into corresponding road sections, and
each of the K alternative routes is a path of the corresponding road sections.

5. The method according to claim 4, wherein:
the manual driving time $T_M$ of the route is calculated as $$T_M = \sum_{i=1}^{N}(1-C_i) \cdot T_i$$

wherein $C_i$ is a road clearance value associated with i-th road section of the route, wherein $C_i=1$ if it is possible to drive autonomously on the i-th road section, wherein $C_i=0$ if it is not possible to drive autonomously on the i-th road section, and wherein N is a number of road sections in the route;
the transition count M of the route is calculated as $$M = 1 - C_1 + \sum_{i=2}^{N} C_{i-1} \cdot (1-C_i);$$

the travel time T of the route comprising N road sections is calculated as $$T = \sum_{i=1}^{N} T_i$$

wherein $T_i$ is a travel time for i-th road section of the route; and/or
a stressing cost function S of the route is calculated as $$S = (1-C_1) \cdot f_1 + \sum_{i=2}^{N}(C_{i-1} \cdot (1-C_i)) \cdot f_i$$

wherein $f_i$ is a weighting function characterizing a stress to a driver caused by a transition at the i-th road section of the route.

6. The method according to claim 1, wherein the K alternative routes are computed by taking into consideration road clearance values, each road clearance value being associated with a respective road section and indicating whether or not it is possible to drive autonomously on the respective road section.

7. The method according to claim 1, wherein the reducing the Pareto-optimized routes in the set of Pareto-optimized routes to P comprises selecting from the set of Pareto-optimized routes P Pareto-optimized routes that meet one or more of the following criteria:
a minimum of the travel time T in comparison to the Pareto-optimized routes in the set of Pareto-optimized routes;
a minimum of the manual driving time $T_M$ in comparison to the Pareto-optimized routes in the set of Pareto-optimized routes;
a minimum of the transition count M in comparison to the Pareto-optimized routes in the set of Pareto-optimized routes; or
a minimal stressing cost function S in comparison to the Pareto-optimized routes in the set of Pareto-optimized routes.

8. The method according to claim 1, wherein the reducing the Pareto-optimized routes in the set of Pareto-optimized routes to P comprises selecting from the set of Pareto-optimized routes P Pareto-optimized routes that maximize a quality measure Q:

$$Q = \frac{1}{\delta \cdot T_M + \gamma \cdot T + \beta \cdot M},$$

wherein $\delta$, $\gamma$, $\beta$ are weights.

9. The method according to claim 1, wherein
the reducing of the Pareto-optimized routes in the set of Pareto-optimized routes to P further comprises selecting P Pareto-optimized routes that maximize a weighted quality measure Q based on the travel time T, the manual driving time $T_M$, and the transition count M.

10. A device configured to determine routes for an autonomous driving vehicle, comprising:
a memory with computer executable instructions stored therein; and
a processor, coupled to the memory and configured to:
compute K alternative routes from a route source to a route destination of the autonomous driving vehicle;
evaluate each one of the K alternative routes, wherein the evaluating comprises
a determination of a Pareto front of the K alternative routes, wherein
the Pareto front of the K alternative routes comprises a set of Pareto-optimized routes that are Pareto-optimized with regard to route constraints comprising a travel time T of the route, a manual driving time $T_M$ of the route, and a transition count M that indicates a count of transitions from an autonomous driving mode to a manual driving mode;
when the set of Pareto-optimized routes comprises more than P routes, reduce the Pareto-optimized routes in the set of Pareto-optimized routes to P; and
output the Pareto-optimized routes of the set of Pareto-optimized routes as the determined routes for autonomous driving, wherein
the evaluation of each one of the K alternative routes further comprises the following with regard to each one of the K alternative routes:
an evaluation of each realization of the corresponding alternative route from a plurality of realizations of the corresponding alternative route, wherein
the realizations of the corresponding alternative route in the plurality of realizations of the corresponding alternative route differ with regard to the route constraints, and the evaluation of each realization of the corresponding alternative route from a plurality of realizations of the corresponding alternative route comprises a determination of a Pareto front of the corresponding alternative route comprising a set of Pareto-optimized route realizations of the corresponding alternative route that are Pareto-optimized with regard to the route constraints; and an insertion into the Pareto front of the K alternative routes Pareto-optimized route realizations of the set of Pareto-optimized route realizations of the corresponding alternative route.

11. The device according to claim 10, wherein the route constraints further comprise a stressing cost function that indicates a stress caused to a driver by the transitions from the autonomous driving to the manual driving.

12. The device according to claim 11, wherein the route constraints further comprise an autonomous travel time.

13. The device according to claim 10, wherein the K alternative routes are computed with regard to a digital road map comprising roads divided into corresponding road sections, and each of the K alternative routes is a path of the corresponding road sections.

14. The device according to claim 10, wherein the K alternative routes are computed by taking into consideration road clearance values, each road clearance value being associated with a respective road section and indicating whether or not it is possible to drive autonomously on the respective road section.

15. The device according to claim 14, wherein: the manual driving time $T_M$ of the route is calculated as $$T_M = \sum_{i=1}^{N}(1-C_i) \cdot T_i$$

wherein $C_i$ is a road clearance value associated with i-th road section of the route, wherein $C_i=1$ if it is possible to drive autonomously on the i-th road section, wherein $C_i=0$ if it is not possible to drive autonomously on the i-th road section, and wherein N is a number of road sections in the route;

the transition count M of the route is calculated as $$M = 1 - C_1 + \sum_{i=2}^{N} C_{i-1} \cdot (1-C_i);$$

the travel time T of the route comprising N road sections is calculated as $$T = \sum_{i=1}^{N} T_i$$

wherein $T_i$ is a travel time for i-th road section of the route; and/or
a stressing cost function S of the route is calculated as $$S = (1-C_1) \cdot f_1 + \sum_{i=2}^{N}(C_{i-1} \cdot (1-C_i)) \cdot f_i$$

wherein $f_i$ is a weighting function characterizing a stress to a driver caused by a transition at the i-th road section of the route.

16. The device according to claim 10, wherein the reduction of the Pareto-optimized routes in the set of Pareto-optimized routes to P comprises a selection from the set of Pareto-optimized routes P Pareto-optimized routes that meet one or more of the following criteria:

a minimum of the travel time T in comparison to the Pareto-optimized routes in the set of Pareto-optimized routes;

a minimum of the manual driving time $T_M$ in comparison to the Pareto-optimized routes in the set of Pareto-optimized routes;

a minimum of the transition count M in comparison to the Pareto-optimized routes in the set of Pareto-optimized routes; or a minimal stressing cost function S in comparison to the Pareto-optimized routes in the set of Pareto-optimized routes.

17. The device according to claim 10, wherein the reduction of the Pareto-optimized routes in the set of Pareto-optimized routes to P comprises a selection from the set of Pareto-optimized routes P Pareto-optimized routes that maximize a quality measure Q:

$$Q = \frac{1}{\delta \cdot T_M + \gamma \cdot T + \beta \cdot M},$$

wherein $\delta, \gamma, \beta$ are weights.

18. The device according to claim 10, wherein the reduction of the Pareto-optimized routes in the set of Pareto-optimized routes to P further comprises a selection of P Pareto-optimized routes that maximize a weighted quality measure Q based on the travel time T, the manual driving time $T_M$, and the transition count M.

* * * * *